(12) United States Patent
Shimizu et al.

(10) Patent No.: US 8,156,087 B2
(45) Date of Patent: *Apr. 10, 2012

(54) RECORDING MEDIUM STORING SYSTEM ANALYSIS PROGRAM, SYSTEM ANALYSIS APPARATUS AND SYSTEM ANALYSIS METHOD

(75) Inventors: Toshihiro Shimizu, Kawasaki (JP); Hirokazu Iwakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 376 days.

This patent is subject to a terminal disclaimer.

(21) Appl. No.: 12/431,637

(22) Filed: Apr. 28, 2009

(65) Prior Publication Data

US 2010/0050186 A1 Feb. 25, 2010

(30) Foreign Application Priority Data

Aug. 19, 2008 (JP) .................................. 2008-210643

(51) Int. Cl.
*G06F 7/00* (2006.01)
*G06F 17/30* (2006.01)

(52) U.S. Cl. ...................................................... 707/691

(58) Field of Classification Search .................. 707/603, 707/691
See application file for complete search history.

(56) References Cited

U.S. PATENT DOCUMENTS

| 5,878,420 | A | * | 3/1999 | de la Salle ............................. 1/1 |
| 6,650,731 | B1 | * | 11/2003 | Steltner et al. ............. 379/15.01 |
| 2002/0177910 | A1 | * | 11/2002 | Quarterman et al. ........... 700/28 |
| 2004/0122942 | A1 | * | 6/2004 | Green et al. ................... 709/224 |
| 2005/0289231 | A1 | | 12/2005 | Harada et al. |
| 2006/0195554 | A1 | * | 8/2006 | Payne et al. ................... 709/219 |

FOREIGN PATENT DOCUMENTS

JP A 2006-11683 1/2006

* cited by examiner

*Primary Examiner* — James Trujillo
*Assistant Examiner* — Jorge A Casanova
(74) *Attorney, Agent, or Firm* — Greer, Burns & Crain, Ltd

(57) ABSTRACT

A system analysis apparatus includes a message reconstruction module which reconstructs observed data and data of which the observation has failed, into messages regarding a request and a response which are communicated on a system. The apparatus includes a message candidate extraction module which compares message rules with the reconstructed messages, and extracts messages in the message rules which are identical to the reconstructed messages, from the messages defined in the message rules, as message candidates. The apparatus includes a call relationship extraction module which extracts a call relationship between the message candidates. The apparatus includes a matching module which compares transaction models in which processes in units of transactions on the system have been modeled on the basis of call relationships among the processes on the system, with the extracted call relationship, and selects and determines a transaction model identical to the call relationship.

17 Claims, 19 Drawing Sheets

FIG. 3

| PROTOCOL TYPE | MESSAGE NAME | MESSAGE STRING |
|---|---|---|
| HTTP | a | /tarobank.co.jp/service.cgi?a=1234 |
| HTTP | b | /tarobank.co.jp/service.cgi?a=2 |
| HTTP | c | /tarobank.co.jp/service3.cgi?a=1235 |
| .. | .. | .. |
| IIOP | e | Mbalance |
| IIOP | f | Mdeposit |
| .. | .. | .. |
| SQL | h | Fetch Account,Update Account |
| SQL | i | |

FIG. 4

| RECEPTION TIME INSTANT | IDENTIFICATION NUMBER | PROTOCOL TYPE | DIRECTION | MESSAGE CANDIDATE/MESSAGE RESPONSE TIME |
|---|---|---|---|---|
| 00.00.00:100 | 1 | HTTP | Request | H1,H2 |
| 00.00.00:150 | 1 | IIOP | Request | I1 |
| 00.00.00:190 | 1 | SQL | Request | R1R2R3 |
| 00.00.00:200 | 1 | SQL | Response | 0.010 |
| 00.00.00:240 | 1 | IIOP | Response | 0.090 |
| 00.00.00:290 | 1 | HTTP | Response | 0.190 |

FIG. 5

| MESSAGE LABEL | MESSAGE NAME |
|---|---|
| H1 | a,A,Z |
| H2 | b |
| .. | .. |
| I1 | e,E |
| I2 | f |
| .. | .. |
| R1R2R3 | h |
| .. | .. |

FIG. 6

| CALLER MESSAGE | CALL TARGET MESSAGE |
|---|---|
| H1, H2 | I1 |
| I1 | R1R2R3 |

FIG. 7

| MODEL NUMBER | CALLER MESSAGE | CALL TARGET MESSAGE | PROCESSING TIME |
|---|---|---|---|
| 1 | H1 | I1 | 0.100 |
| 1 | I1 | R1R2R3 | 0.110 |
| 2 | H2 | I2 | 0.500 |
| 2 | I2 | R4R5R5 | 0.010 |
| 3 | H3 | I1 | 0.090 |
| 3 | H3 | I2 | 0.190 |
| 3 | I1 | R1R2R3 | 0.200 |
| 3 | I2 | R3R4R5 | 0.150 |

RECORDING MEDIUM STORING SYSTEM ANALYSIS PROGRAM, SYSTEM ANALYSIS APPARATUS AND SYSTEM ANALYSIS METHOD

CROSS-REFERENCE TO RELATED APPLICATIONS

This application is based upon and claims the benefit of priority of the prior Japanese Patent Application No. 2008-210643, filed on Aug. 19, 2008, the entire contents of which are incorporated herein by reference.

FIELD

The present invention relates to a system analysis technique for a system composed of a plurality of computers.

BACKGROUND

In recent years, systems are often constructed on the basis of a Web three-layer model (three-tier model). This three-tier model consists of a Web, an application and a DB (Data Base). On the basis of operations in which the Web calls the application and the application accesses the DB, a series of processes (business or a transaction) is performed.

In a three-tier system which executes processes regarding one transaction in a distributed manner, it has been difficult to know which process in each transaction takes the most time, unless each executed software is modified and altered. However, for example, in the banking business, in a large-scale system which realizes business such as a transfer process or referring to an account, from a Web server, a combination of software developed by various people or companies is often used to constitute the system. Thus, the software cannot be realistically altered. Hence, when performance of one transaction has degraded, a part of a specific cause has not been able to be known.

Consequently, as shown in FIG. 19, in a system composed of a plurality of computers, a system operation status analysis has been proposed in which data flowing on a network is observed and a processing time for each service providing function is calculated, without modifying the service providing function executed on each computer.

Japanese Laid-Open Patent Publication No. 2006-11683 (US Patent Application Publication No. 2005-0289231) discloses a system analysis apparatus which, on the basis of data obtained through observation on a network, generates transaction models from a set of messages on a system and call relationships among the messages, and analyzes an operation status of the system.

However, when the data on the network is observed, the data observation may partially fail. In such a case, all data related to the data for which the observation has failed cannot be used for an analysis process. In other words, when only a part of a message is unknown, the message cannot be restored even if other parts thereof are known, and moreover, the entire transaction is also handled as an incomplete transaction. Furthermore, it can be said that this is equal to a state where all messages regarding a corresponding transaction are not observed.

Moreover, there is a known technique in which, with respect to a message for which the data observation has partially failed, a content of a packet is estimated at a time point when the message is restructured. However, if an estimated value is not appropriate, the entire transaction is handled as an inappropriate transaction in this technique.

Consequently, in order to solve the above described problems, it is an object of the disclosed technique to enable estimation of the transaction which has not been able to be estimated before, and furthermore, in comparison with the case where packet loss data is directly estimated, to improve a success rate of a comparison process (hereinafter, referred to as "matching process") with transaction models.

SUMMARY

A system analysis apparatus includes a data observation module which observes data which is elements constituting messages communicated on an analysis target system. The apparatus includes a message reconstruction module which, if the observation of the data has partially failed, reconstructs the observed data and the data of which the observation has failed, into messages regarding a request and a response which are communicated on the system. The apparatus includes a message candidate extraction module which compares message rules in which contents of the messages have been defined, with the reconstructed messages, and extracts messages in the message rules which are identical to the reconstructed messages, from the messages defined in the message rules, as message candidates. The apparatus includes a call relationship extraction module which extracts a call relationship between the message candidates.

The apparatus includes a matching module which compares transaction models in which processes in units of transactions on the system have been modeled on the basis of call relationships among the processes on the system, with the extracted call relationship, and selects and determines a transaction model identical to the call relationship.

BRIEF DESCRIPTION OF DRAWINGS

FIG. 3 illustrates a diagram showing an example of message rule information according to the embodiment;

FIG. 4 illustrates a diagram showing an example of message candidate information according to the embodiment;

FIG. 5 illustrates a diagram showing an example of message label information according to the embodiment;

FIG. 6 illustrates a diagram showing an example of call relationship information according to the embodiment;

FIG. 7 illustrates a diagram showing an example of transaction models according to the embodiment;

DESCRIPTION OF EMBODIMENTS

Figure 1:
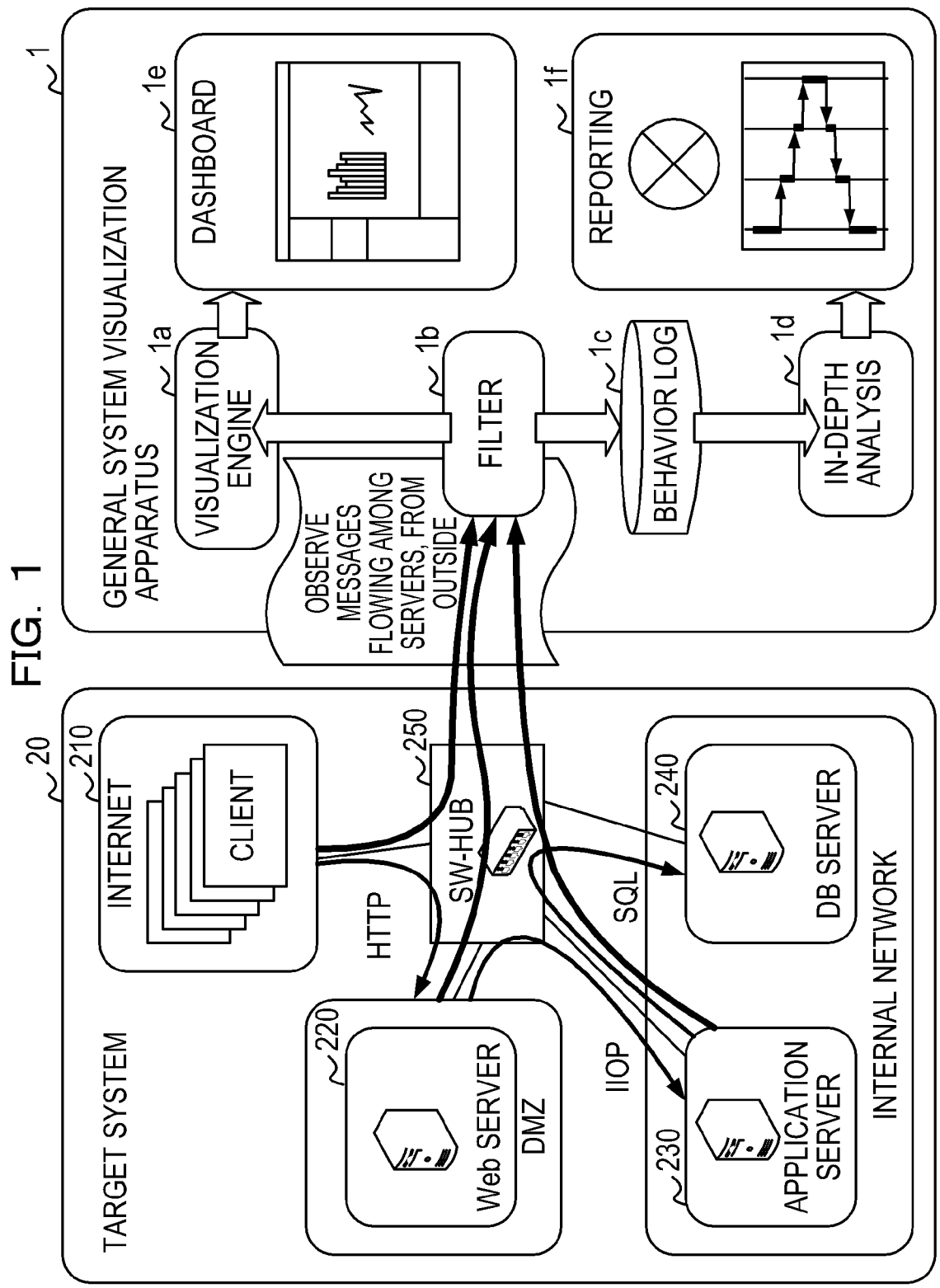
FIG. 1 illustrates a diagram showing an outline of a configuration of a general system visualization apparatus according to an embodiment.

Before describing a system visualization apparatus which is a system analysis apparatus in the present embodiment, an outline of the system visualization apparatus with respect to a target system composed of a three-tier model will be described. FIG. 1 illustrates a diagram showing an example of a configuration of a general system visualization apparatus with respect to the target system composed of the three-tier model.

A target system 20 which is a target of visualization by a general system visualization apparatus 1 will be described. The target system 20 is composed of a three-tier model including a client 210, a Web server 220, an application server 230, a DB server 240, and a SW-HUB 250 which is a communication device.

The client 210 uses an HTTP (Hyper Text Transfer Protocol) to make a request for a process to the Web server 220. In order to execute the process requested by the client 210, the Web server 220 which has received the request uses an IIOP (Internet Inter Object Request Broker Protocol) to hand over the process to the application server 230. The application server 230 uses an SQL (Structured Query Language) to instruct the DB server 240 to perform processes such as search, updating and deletion regarding information required to execute the requested process.

The client 210, the Web server 220, the application server 230 and the DB server 240 communicate messages such as requests to one another and responses to the requests, via the communication device such as the SW-HUB (Switch-Hub) 250.

Next, the general system visualization apparatus 1 which is an apparatus which observes execution statuses of the processes in such a target system 20 from outside the target system 20 and visualizes the execution statuses will be described.

The general system visualization apparatus 1 observes communication packets (data) flowing through the communication device such as the SW-HUB 250, from outside the target system 20.

The general system visualization apparatus 1 extracts necessary messages from the observed communication packets by means of a function of a filter 1b. A visualization engine 1a calculates the execution statuses of the processes executed by the Web server 220, the application server 230 and the DB server 240 in the target system 20, from the extracted messages, and displays the execution statuses on a display such as a dashboard 1e. Moreover, the extracted messages are accumulated as a behavior log 1c. A function of an in-depth analysis 1d analyzes the execution statuses in the target system 20 by using the behavior log 1c, and outputs a document such as a reporting 1f as an analysis result.

Figure 2:
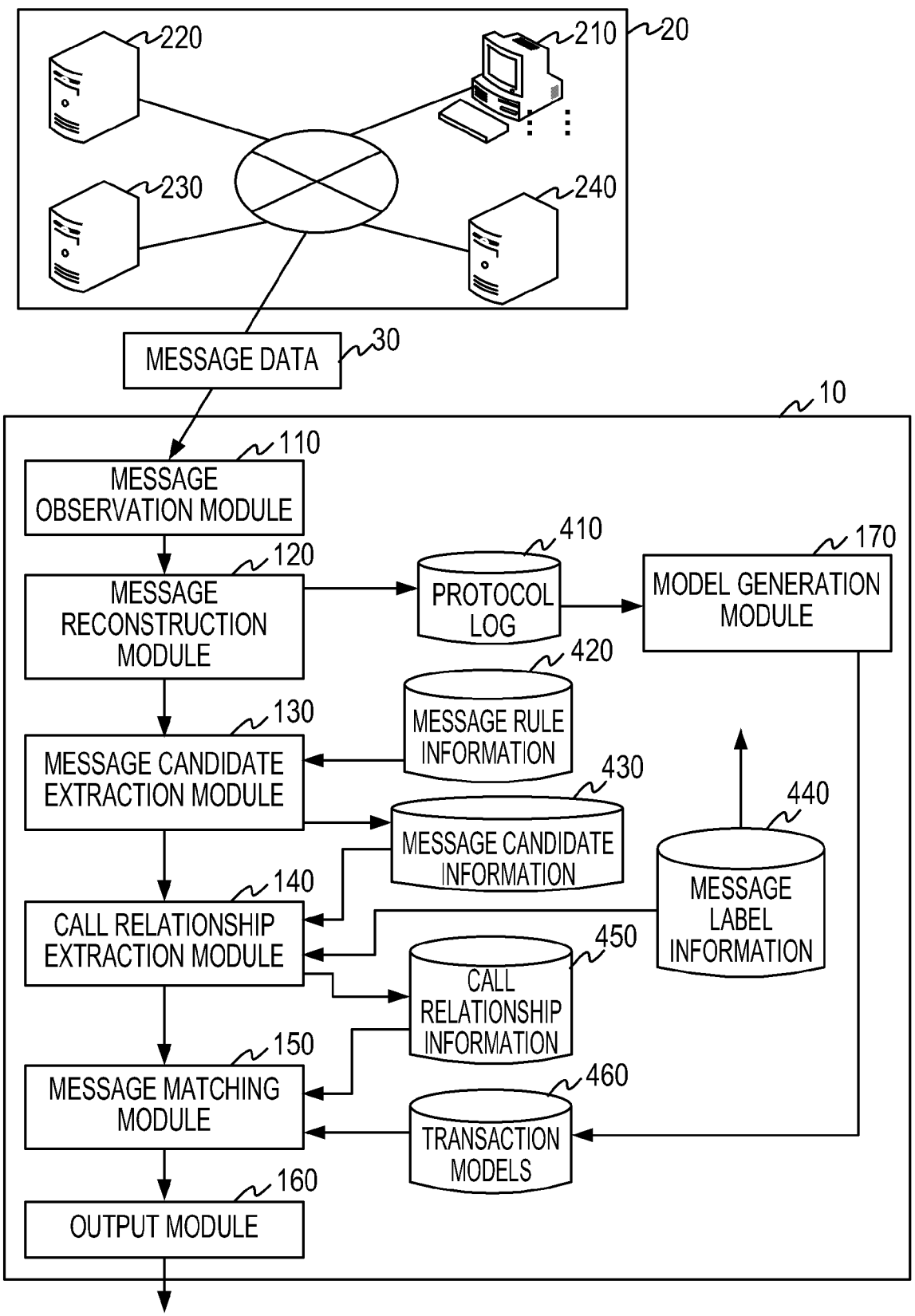
FIG. 2 illustrates a diagram showing an example of a basic configuration according to the embodiment.

Next, FIG. 2 illustrates an example of a basic configuration in the embodiment of the present invention.

The basic configuration is composed of a system visualization apparatus 10 (system analysis apparatus) and the target system 20 which is the visualization target. The system visualization apparatus 10 observes message data 30 (data) flowing on the target system 20.

The target system 20 includes the client 210, the Web server 220, the application server 230 and the DB server 240.

The system visualization apparatus 10 includes a message observation module 110 (data observation module) a message reconstruction module 120, a message candidate extraction module 130, a call relationship extraction module 140, a message matching module 150 (matching module), an output module 160, and a model generation module 170. Moreover, the system visualization apparatus 10 retains a protocol log 410, message rule information 420 (message rules), message candidate information 430, message label information 440, call relationship information 450, and information on transaction models 460.

Next, each piece of information retained by the system visualization apparatus 10 will be described.

The protocol log 410 is log information in which the message data 30 corresponding to one communication packet flowing on a network has been reconstructed in units of messages. In addition, the protocol log 410 has been limited to process request messages and response messages to the respective servers, from all observed messages. Moreover, if a direction of the message is the request message (Request), the protocol log 410 is composed of a reception time instant, an identification number which identifies a message having an association in units of transactions, a protocol type which identifies the HTTP, the IIOP or the SQL, "Request" indicating the direction of the message, and a message string which is a content of the message. If the direction of the message is the response message (Response), the protocol log 410 is composed of the reception time instant, the identification number which identifies the message having the association in units of transactions, the protocol type which identifies the HTTP, the IIOP or the SQL, "Response" indicating the direction of the message, and a response time representing a time from reception of the request message until transmission of the response message.

Next, the message rule information 420 is shown in FIG. 3. The message rule information 420 is information in which data parts of the request messages communicated on the target system 20 have been defined in a text format. The message rule information 420 is composed of the protocol type, a message name, and the message string.

Next, the message candidate information 430 is shown in FIG. 4. The message candidate information 430 retains information indicating the messages defined in the message rule information 420 to which request messages in the transaction models 460 can be identical, and the information regarding the response messages, which is the same as the protocol log 410. If the direction of the message is the request message (Request), the message candidate information 430 is composed of the reception time instant, the identification number, the protocol type, the direction, and a message candidate represented by a message label to be described later. If there have been a plurality of message candidates, the message candidates are represented in a set. Moreover, if the direction of the message is the response message (Response), the message candidate information 430 is composed of the reception time instant, the identification number, the protocol type, the direction, and the message response time.

Next, the message label information 440 is shown in FIG. 5. The message label information 440 is information representing labels for the request messages defined in the message rule information 420. In an example shown in FIG. 5, messages in the HTTP are represented by H1 and H2, messages in the IIOP are represented by I1 and I2, and messages in the SQL are represented by R1, R2, R3, R4, R5 and R6. When a transaction is considered, the same label may be given to a plurality of messages based on the contents or characteristics of the request messages. Moreover, the message label information 440 is composed of the message label and a set of message names.

Next, the call relationship information 450 is shown in FIG. 6. In the present embodiment, if the process requested via the request message further issues another process request message in that process, it is said that there is a call relationship between the request message (caller message) and another process request message (call target message) issued by the requested process. The call relationship information 450 is information representing this call relationship between the request messages. The call relationship information 450 is composed of a pair of the caller message and the call target message.

Figure 8:
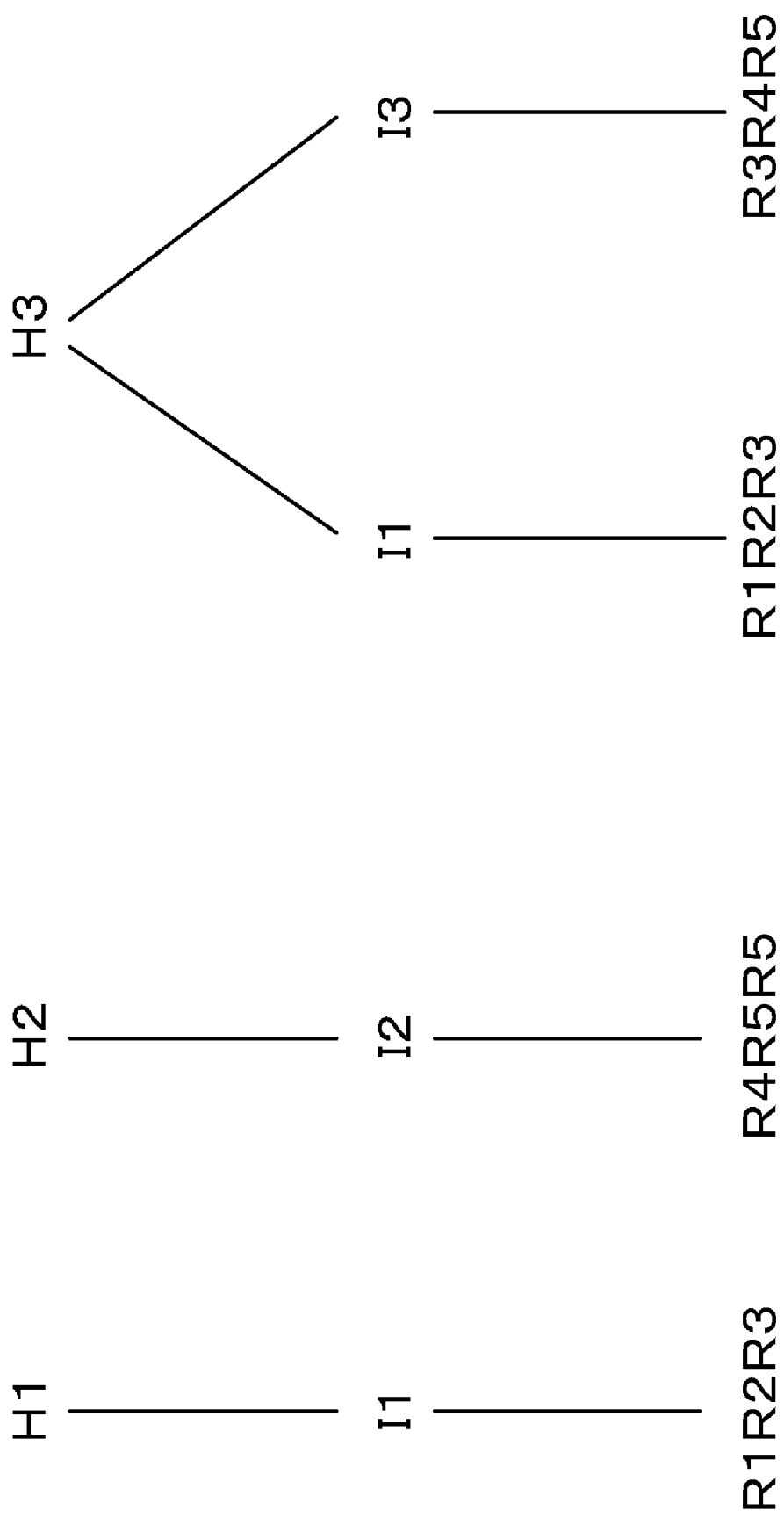
FIG. 8 illustrates a diagram showing an image of the transaction models according to the embodiment (No. 1)

Next, the transaction models 460 are shown in FIG. 7. The transaction models 460 are information in which processes in units of transactions executed by the target system 20 have been modeled on the basis of call relationships among the request messages for making the process requests to the respective servers. The transaction models 460 are composed of a model number, the caller message, the call target message, and a processing time. Moreover, with respect to three transactions with the model numbers 1, 2 and 3 as shown in FIG. 7, an image diagram of the transaction models is shown in FIG. 8.

Next, the respective functions of the system visualization apparatus 10 will be described.

The message observation module 110 has a function of observing the message data 30 flowing on the target system 20, and handing over the observed message data 30 to the message reconstruction module 120.

The message reconstruction module 120 restructures the message data 30 into the messages, and generates the protocol log 410, which is limited to combinations of the messages representing the process requests and the responses to the requests.

The message candidate extraction module 130 compares the request messages in the protocol log 410 with the message rule information 420, and extracts the message candidates which can be the same as the request messages.

The call relationship extraction module 140 uses the message candidate information 430 to extract call relationships among the processes among the Web server 220, the application server 230 and the DB server 240, and stores the call relationships in the call relationship information 450.

The model generation module 170 generates the transaction models 460 which are the information in which the processes in units of transactions (business) have been modeled on the basis of the call relationships. The transaction models 460 are information in which the processes in units of transactions (business) realized in the target system 20 have been modeled on the basis of the call relationships among the Web server 220, the application server 230 and the DB server 240 by using the protocol log 410. A specific generation method has been described in Japanese Laid-Open Patent Publication No. 2006-11683 (US Patent Application Publication No. 2005-0289231).

The message matching module 150 compares the call relationship information 450 with the transaction models 460, selects a transaction model to which the observed messages correspond, and hands over the transaction model as information regarding the execution statuses of the processes in the target system 20, to the output module 160.

The output module 160 has outputs the execution statuses of the processes in the target system 20 as visualized information.

These respective functions are realized by cooperation between hardware resources such as a CPU, a memory and a hard disk, and software, which are included in the system visualization apparatus 10 and not shown.

Figure 9:
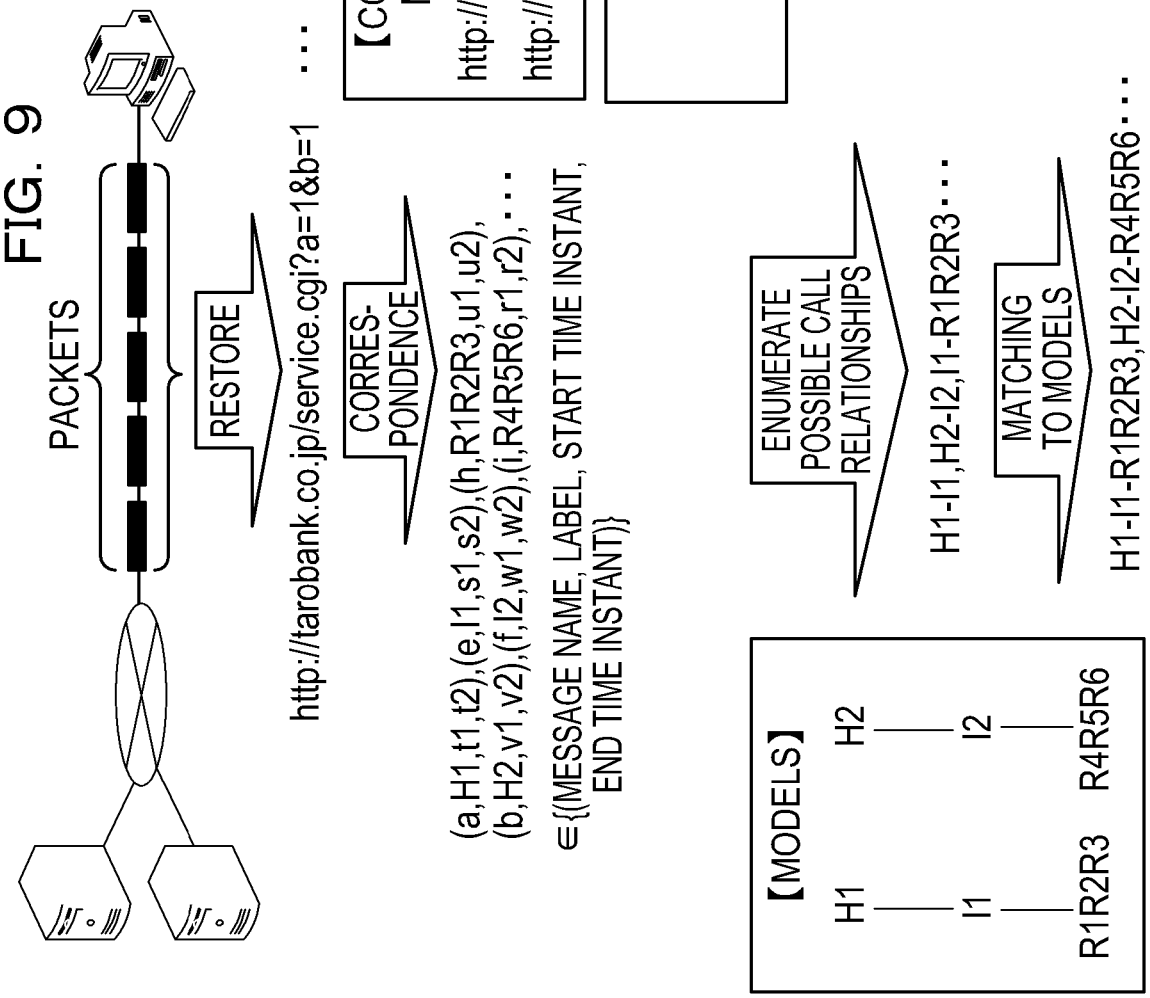
FIG. 9 illustrates a diagram showing an example of an outline of operations of the system visualization apparatus according to the embodiment.

Next, an example of an outline of operations of the system visualization apparatus 10 is shown in FIG. 9.

First, the system visualization apparatus 10 starts a process according to an execution instruction from a user. The system visualization apparatus 10 reconstructs the message data 30 observed by the message observation module 110 into the messages by the message reconstruction module 120. Next, the message candidate extraction module 130 gives appropriate message labels to strings corresponding to data parts in restored messages. Next, the call relationship extraction module 140 enumerates possible call relationships among the messages, from pairs of the request messages and the response messages among the restored messages, on the basis of a start time instant and a response time instant of each requested process, and performs matching to the transaction models 460.

The message observation module 110 observes the message data 30 flowing on the target system 20, and hands over the process along with the observed message data 30 to the message reconstruction module 120.

The message reconstruction module 120 reconstructs respective pieces of the message data 30, and limits the respective pieces of the message data 30 to the combinations of the messages representing the process requests and the responses to the requests. Then, the message reconstruction module 120 accumulates the information on the reception time instant, the identification number given for each transaction, the protocol type which identifies the HTTP, the IIOP or the SQL, and the direction of the message (Request/Response) which distinguishes between the request message and the response message to the request, as the protocol log 410. Furthermore, in the case of the request message, the message reconstruction module 120 accumulates the information on the data part which is the content of the message, as the protocol log 410. In the case of the response message, the message reconstruction module 120 calculates the response time representing the time from the reception of the request message until the transmission of the response message, and accumulates the information thereon as the protocol log 410.

If the observation of the message data 30 has partially failed (at a time of packet loss), it is assumed that that part can be an arbitrary string, and the messages are reconstructed.

Next, the message candidate extraction module 130 extracts messages which can be the same as the request messages stored in the protocol log 410, as the message candidates, from the messages defined in the message rule information 420. Then, the message candidate extraction module 130 gives the labels to which the message candidates correspond, to the message candidates, and stores the message candidates in the message candidate information 430. If there have been a plurality of message candidates for one request message, the message candidate extraction module 130 stores the message candidates as the set. Moreover, the message candidate extraction module 130 replicates the response messages stored in the protocol log 410, as the message candidate information 430.

Next, the call relationship extraction module 140 uses the message candidate information 430 to extract the call relationships among the processes among the Web server 220, the application server 230 and the DB server 240, from the call relationships among the messages, and stores the call relationships in the call relationship information 450.

Figure 10:
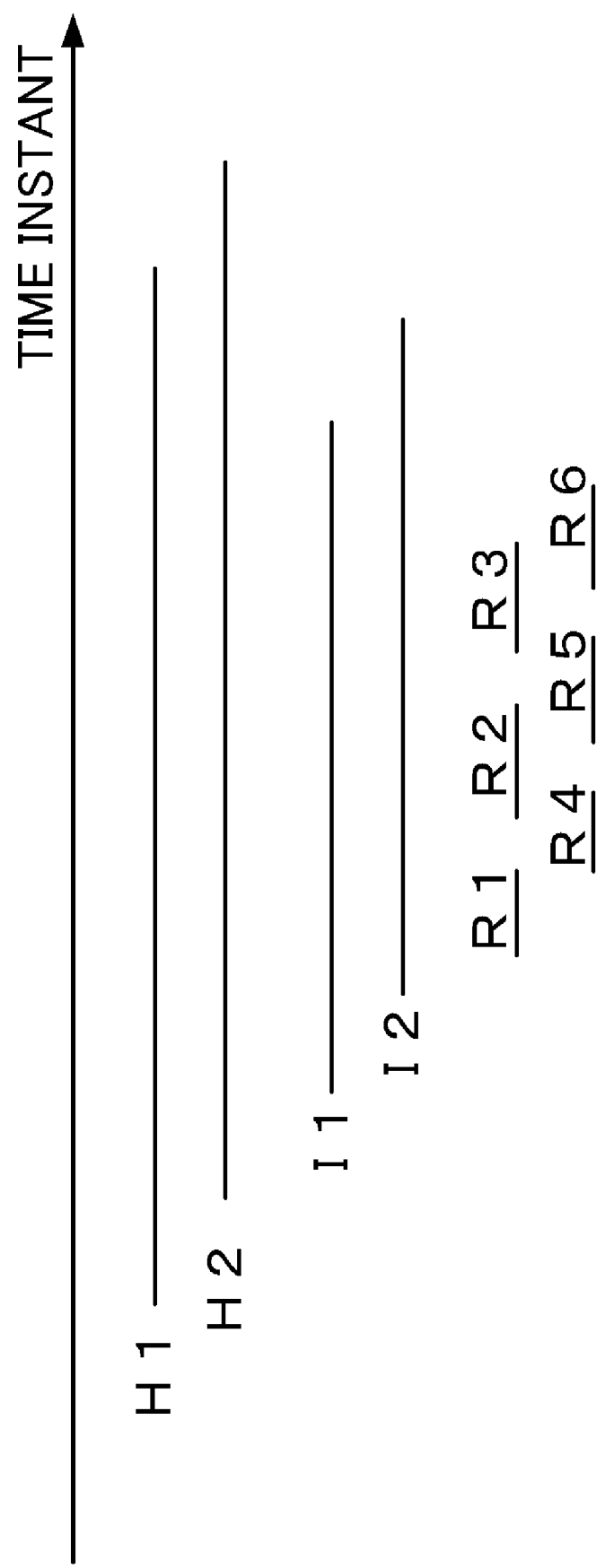
FIG. 10 illustrates a diagram showing an example of message call relationships according to the embodiment.

Here, an example of the call relationships among the messages is shown in FIG. 10. The figure represents elapse of time from left to right, and one solid line represents a pair of the request and the response of one message. A left end of the solid line represents the reception time instant of the request message, a length of the solid line represents the time until the response, and a right end of the solid line represents the reception time instant of the response message. Moreover, symbols such as H1 and H2 are the message labels. The messages in the HTTP are represented by H1 and H2, the messages in the IIOP are represented by I1 and I2, and the messages in the SQL are represented by R1, R2, R3, R4, R5 and R6. If one transaction is executed, the process request to the DB server 240 is generally made multiple times, and as R1, R2 and R3, or R4, R5 and R6 shown in FIG. 10, if each time from the request until the response does not overlap and continuously exists, the messages are handled as a message group consisting of a series of processes.

Next, the call relationships among the processes among the Web server 220, the application server 230 and the DB server 240 will be described.

In process request relationships in the three-tier model, the Web server 220 makes the request to the application server 230, the application server 230 makes the request to the DB server 240, and there is no request in an opposite direction. Moreover, there is no relationship for directly making the process request or the response, between the Web server 220 and the DB server 240. The response to the process request is returned to a requester.

If these process request relationships among the servers are replaced with the call relationships among the request messages, and represented by the protocol types, the call relationships are established among the messages from the HTTP to the IIOP, and from the IIOP to the SQL.

Moreover, on the basis of a time relationship between the request and the response for one process, when a relationship of t1<s1 and t2>s2 is established between a message with the reception time instant of the request message of (t1) and the reception time instant of the response message of (t2), and a message with the reception time instant of the request message of (s1) and the reception time instant of the response message of (s2), it is assumed that there is the possible call relationship between these two request messages.

The call relationship extraction module 140 uses these relationships to extract combinations including the possible call relationships among the request messages in the message candidate information 430.

For example, the combinations including the possible call relationships among the messages shown in FIG. 10 are extracted and represented in a form of (caller message, call target message) as follows.

(H1,I1), (H1,I2), (H2,I1), (H2,I2), (I1,R1R2R3), (I2, R4R5R6)

Figure 11:
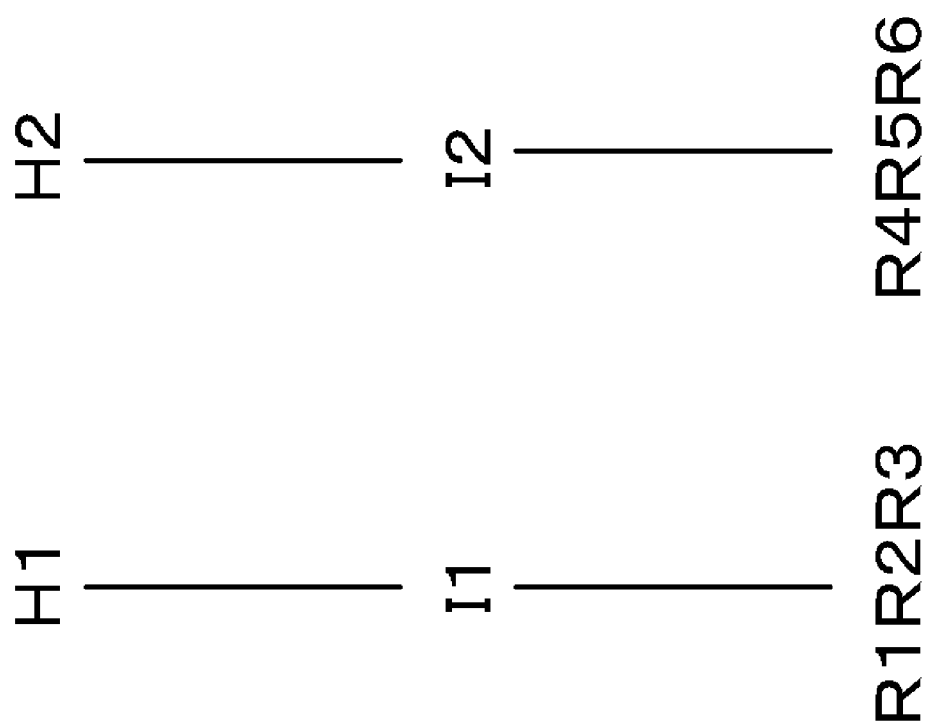
FIG. 11 illustrates a diagram showing an image of the transaction models according to the embodiment (No. 2)

An example of an image of the transaction models in which these parent-child call relationships have been layered and represented in a tree structure is shown in FIG. 11.

The call relationship extraction module 140 stores the call relationships among the messages which have been extracted in this way, in the call relationship information 450.

Next, the model generation module 170 generates the transaction models 460 which are the information in which the processes in units of transactions in the target system 20 have been modeled on the basis of the call relationships among the processes among the Web server 220, the application server 230 and the DB server 240 by using the protocol log 410.

The transaction models 460 are information which is a reference for execution statuses of the transactions in the target system 20, in a process performed by the message matching module 150 to be described later. Thus, before the system visualization apparatus 10 executes the visualization of the target system 20, the model generation module 170 is executed. Moreover, then, the transaction models 460 are generated by using the protocol log 410 at a time when the target system 20 has normally operated, so that standard processing times of the transactions in the target system 20 are calculated.

Next, the message matching module 150 compares the call relationship information 450 with the transaction models 460, determines the transaction model to which the observed messages correspond, and hands over the transaction model as the information regarding the execution statuses of the processes in the target system 20, to the output module 160.

The output module 160 outputs the execution statuses of the processes in the target system 20 as the visualized information.

Next, operations of the system visualization apparatus 10 in the case where the observation of the message data 30 has partially failed for some reason will be described.

Figure 12:
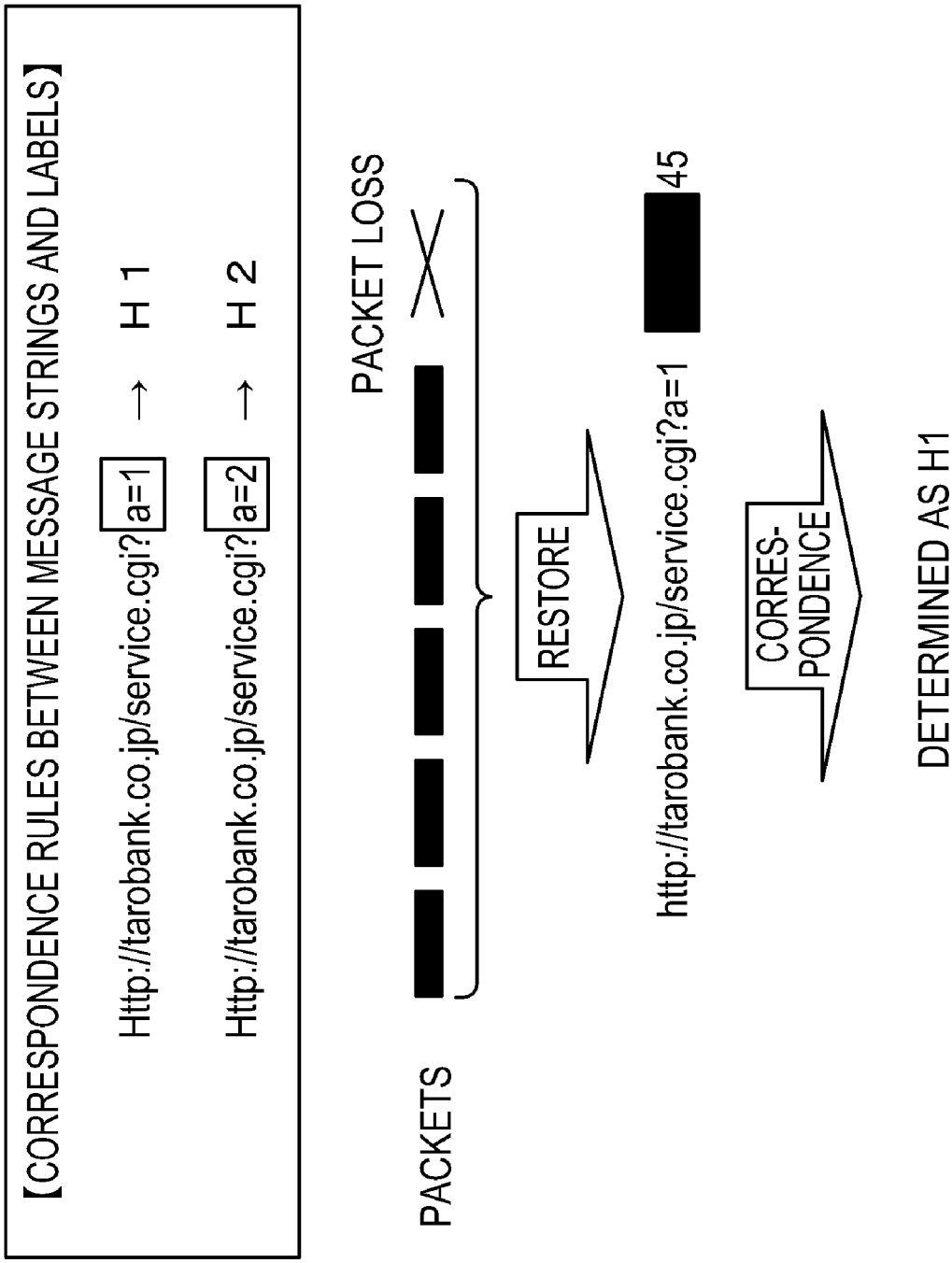
FIG. 12 illustrates a diagram showing an example in which observation of message data has partially failed according to the embodiment (No. 1)
Figure 13:
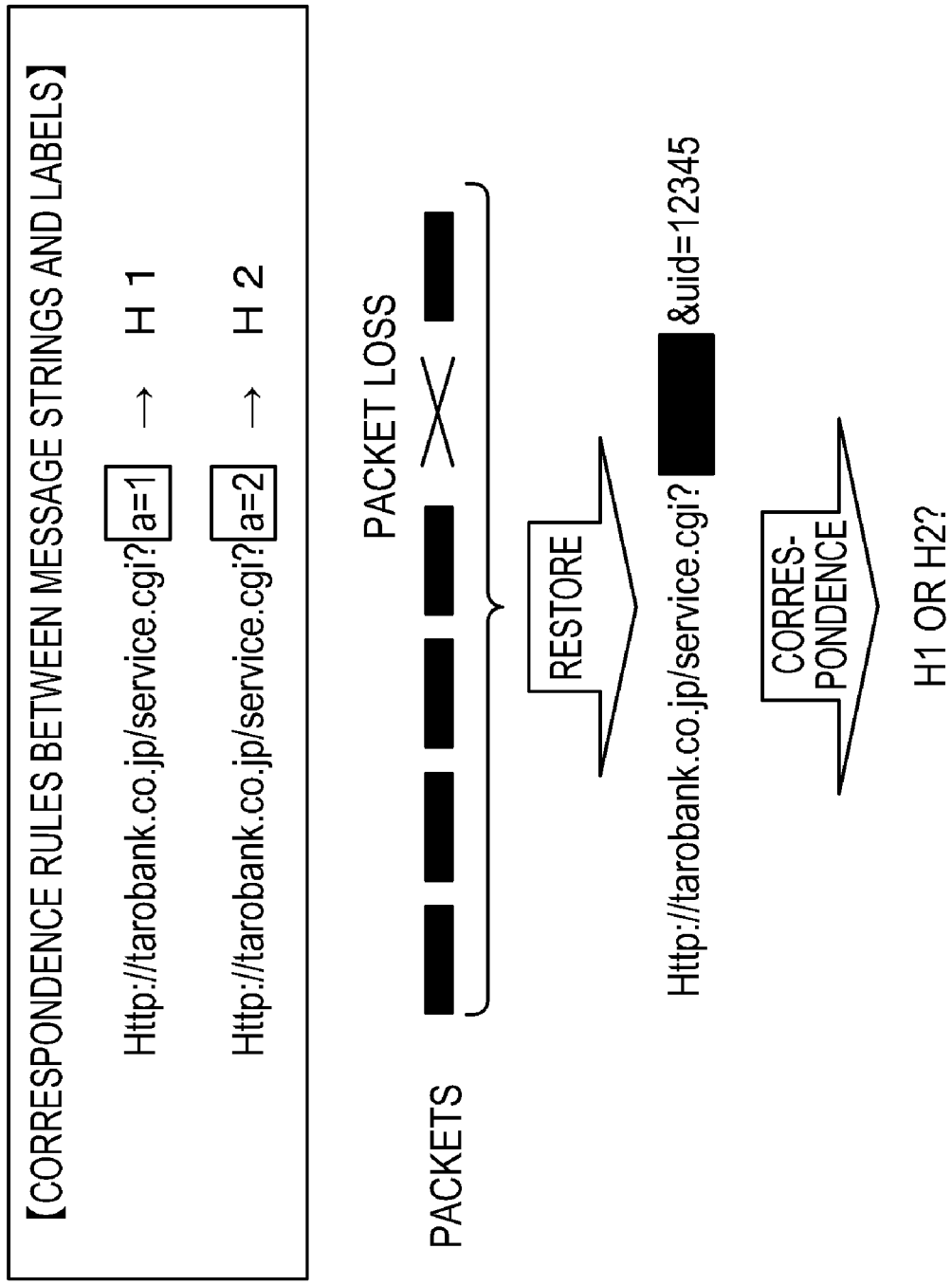
FIG. 13 illustrates a diagram showing an example in which the observation of the message data has partially failed according to the embodiment (No. 2)

As examples of the case where the observation of the message data 30 has partially failed, the case where a last packet in the message has not been able to be observed is shown in FIG. 12, and the case where somewhere in the middle of the message has not been able to be observed is shown in FIG. 13. In these figures, the message rule information 420 is shown to be surrounded by a box.

The message of which the observation has partially failed is reconstructed by the message reconstruction module 120, in a state where the message string is partially unknown as shown in FIGS. 12 and 13 (black rectangular parts in the figures). The number of characters of the unknown part can be judged on the basis of information in the packets.

In the case shown in FIG. 12, if the message rule information 420 is compared with the restored message, since a message which can be the same is only the message with the label of H1, the message can be determined as H1.

In the case shown in FIG. 13, since the messages which can be the same message are two messages with the labels of H1 and H2, the message candidate is a set of {H1,H2}.

Furthermore, a comparison process between the messages stored in the protocol log 410 and the message rules defined in the message rule information 420 will be described.

A string "s" which has been stored as the reconstructed message in the protocol log 410 and in which a hole has been made in a part of the packet loss, is compared with a string "p" which has been defined as the message rule in the message rule information 420, and the message in the message rule which can be identical is set as the message candidate. It is assumed that a length of the hole part has been known.

For example, the hole part with the length of 10 is notated as "*10*", and the case where "http://tarobank.co.jp/*10*a=1&uid=123" is matched to "http://tarobank.co.jp/query.cgi?a=1.*" is considered. Here, ".*" represents a string matching an arbitrary string.

In this case, it is assumed that s="http://tarobank.co.jp/*10*a=1&uid=123" and p="http://tarobank.co.jp/query.cgi?a=1.*". First, a part prior to the hole in "s", "http://tarobank.co.jp/", is compared with "p". Since the part prior to the hole in "s" is identical to "p", next, the strings "s" and "p" are replaced with strings after the compared parts, respectively, so that s="*10*a=1&uid=123" and p="query.cgi?a=1.*".

Next, since a beginning of "s" is "*10*", beginnings of "s" and "p" are removed by the length of 10, respectively, so that s="a=1&uid=123" and p="a=1.*".

If "s" and "p" are further compared with each other, the beginnings of both, "a=1", are identical, and a part after "a=1" in "p" is the arbitrary string. Hence, "s" and "p" have been totally identical except the part represented by "*10*" with the length of 10, and it is assumed that "s" can be a message defined by a string pattern "p".

Figure 14:
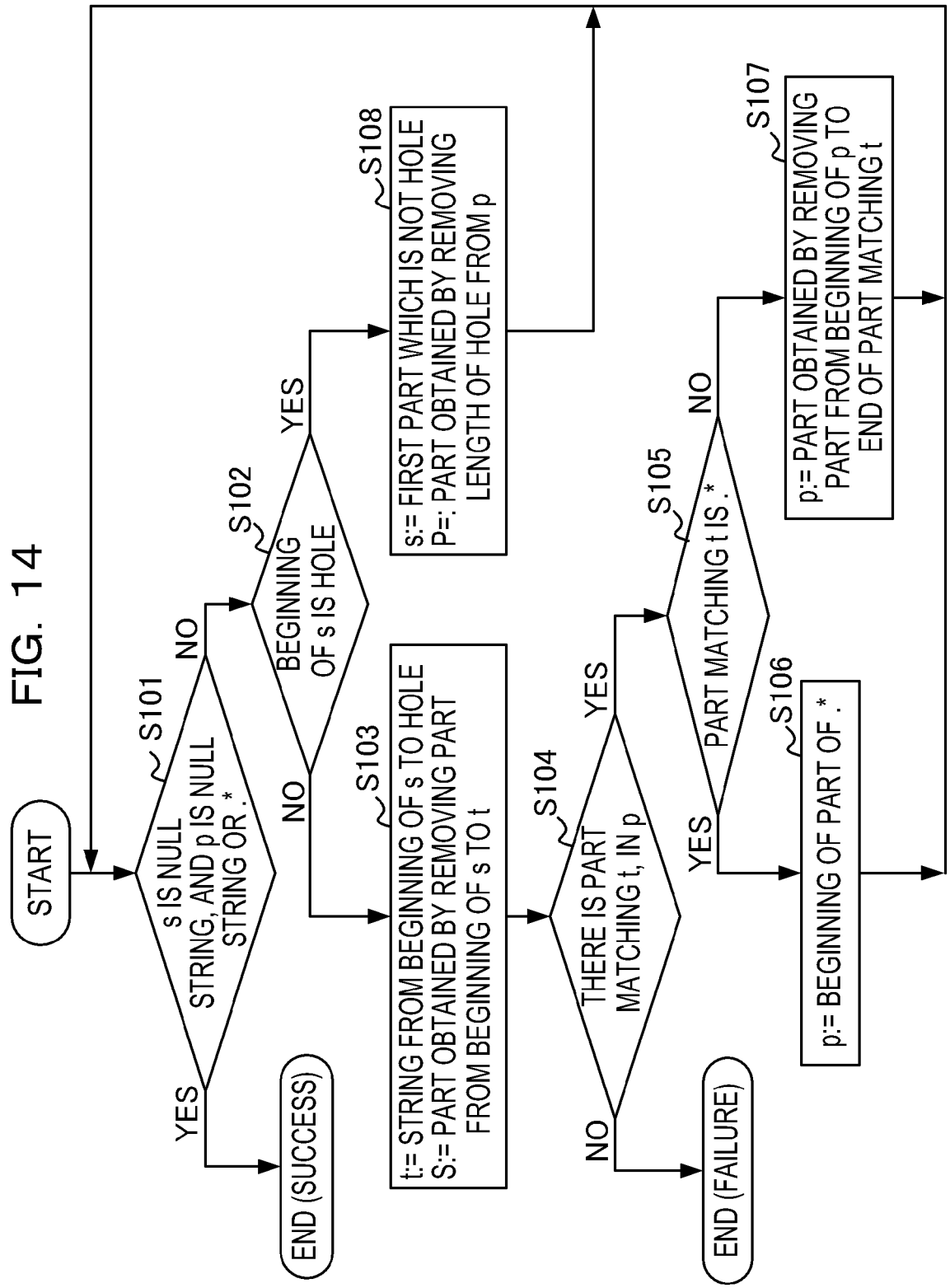
FIG. 14 illustrates a flowchart showing an example of a process in a message candidate extraction module according to the embodiment.

An example of a process in the message candidate extraction module 130, regarding the comparison process between reconstructed message strings and the message rules defined in the message rule information 420, is shown as a flowchart in FIG. 14.

First, the message candidate extraction module 130 is started by the message reconstruction module 120. Then, the message candidate extraction module 130 starts the process in this flowchart by using the part "s" which is the message string of one protocol log obtained from the protocol log 410, and the part "p", which is the message string obtained from the message rule information 420, as input information.

The message candidate extraction module 130 judges whether or not "s" is a null string, and "p" is the null string or the arbitrary string ".*" (S101). If "s" is the null string, and "p" is the null string or the arbitrary string ".*" (S101, YES, a message candidate extraction procedure), the message candidate extraction module 130 judges that "s" corresponds to the message rule of "p", as a result of this process, and completes this flow. Moreover, if it is not true that "s" is the null string, and "p" is the null string or the arbitrary string ".*" (S101, NO), the message candidate extraction module 130 judges whether or not the beginning of "s" is the hole (S102).

If the beginning of "s" is the hole (S102, YES), the message candidate extraction module 130 reads the message string of "s" to a first part which is not the hole, and also similarly reads the message string of "p" for the length corresponding to the hole, and returns to the process in S101. Moreover, if the beginning of "s" is not the hole (S102, NO), the message candidate extraction module 130 reads the message string of "s" to the hole, and sets a string from the beginning of "s" to the hole, as "t" (S103), and judges whether or not the string of "t" corresponds to a part of the string of "p" (S104, the message candidate extraction procedure).

If there is not the same string as "t" in the message string of "p" (S104, NO, the message candidate extraction procedure), the message candidate extraction module 130 judges that "s" does not correspond to the message rule of "p", as a result of this process, and completes this flow. Moreover, if there is the same string as "t" in the message string of "p" (S104, YES, the message candidate extraction procedure), the message candidate extraction module 130 judges whether or not a part of the message string of "p" which has been identical to the string of "t" is the arbitrary string ".*" (S105).

If the part of the message string of "p" which has been identical to the string of "t" is the arbitrary string ".*" (S105, YES), the message candidate extraction module 130 reads the string of "p" to a beginning of the part of ".*" (S106), and returns to a procedure of S101. Moreover, if the part of the message string of "p" which has been identical to the string of "t" is not the arbitrary string ".*" (S105, NO), the message candidate extraction module 130 reads "p" to a part obtained by removing a part from the beginning of the string of "p" to an end of the part which has been identical to the string of "t" (S107), and returns to the procedure of S101.

In this way, the message candidate extraction module 130 compares the string of the request message in the protocol log 410 with all message rules defined in the message rule information 420, as described above. Furthermore, the message candidate extraction module similarly extracts the messages which can be the same, for all message strings stored in the protocol log 410, and stores the messages in the message candidate information 430. If there have been a plurality of messages which can be the same, for one message string, the message candidates are stored as the set.

Next, the call relationship extraction module 140 uses the request messages and the response messages stored in the message candidate information 430 to extract the call relationships among the messages, and stores the call relationships in the call relationship information 450. If the message candidate for the request message stored in the message candidate information 430 is in one of the sets, the caller message and the call target message in the call relationship information 450 are also the same set as that in the message candidate information 430.

Next, the message matching module 150 performs matching between call relationship information stored in the call relationship information 450 and the transaction models stored in the transaction models 460, and determines a transaction model to which the call relationship information corresponds.

Figure 15:
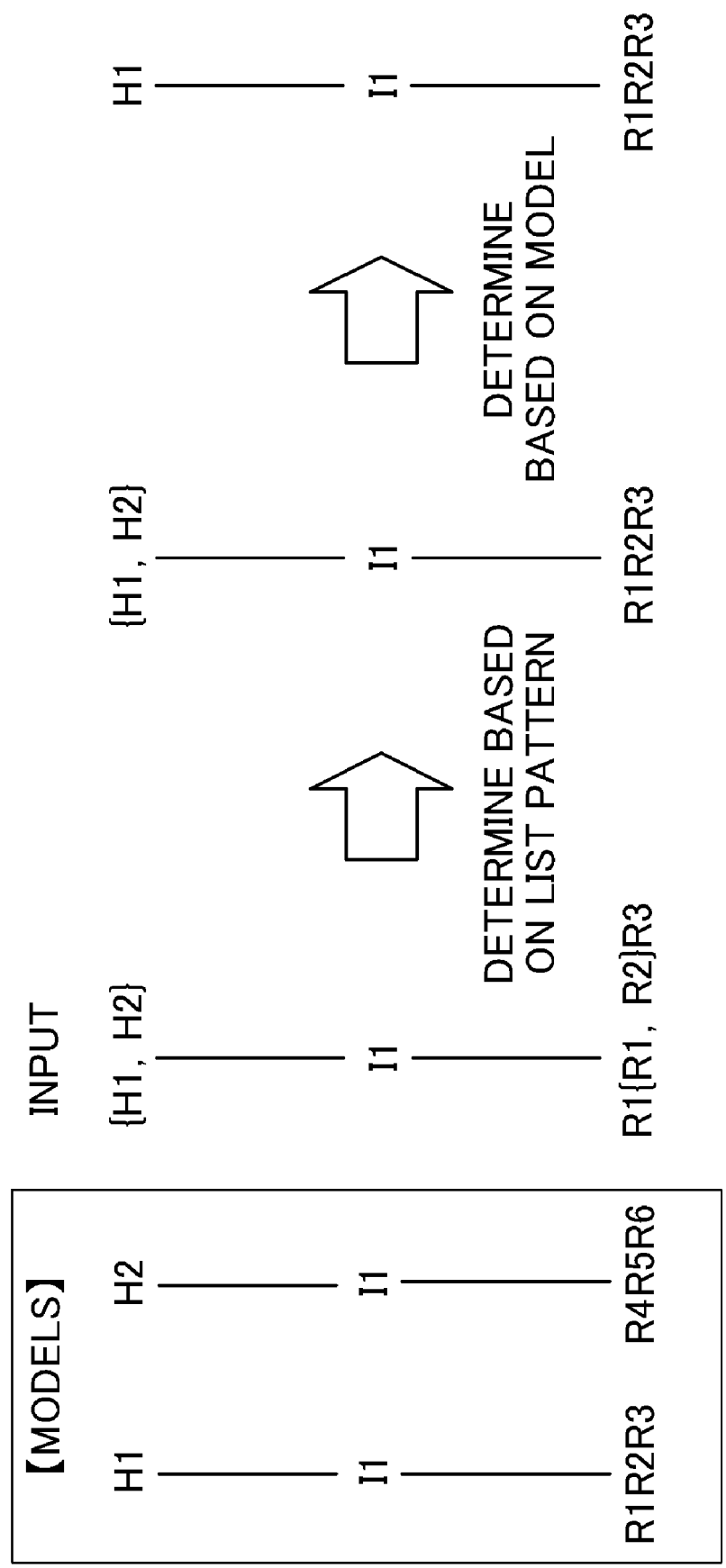
FIG. 15 illustrates a diagram showing an outline of a matching process in a message matching module according to the embodiment.

An outline of a matching process in the message matching module 150 is shown in FIG. 15, and a flow of the matching to the transaction models 460 will be described with an example of call relationship information {(H1,H2),I1} and {I1,R1(R1,R2)R3} which have been stored in the call relationship information 450 and correspond to one transaction. An image shown to be surrounded by a box in the figure represents the transaction models defined in the transaction models 460, in the tree structure.

First, a message group in the SQL, which is represented as a list, R1(R1,R2)R3 is compared with the models. For a second element in the message group shown in the example, a plurality of messages are the candidates. However, in the definition in the transaction models 460, there is only a message group of R1R2R3. Hence, a list part in the transaction shown in the example is found to be R1R2R3.

Furthermore, since there is only one model with the list part of R1R2R3 in the transaction models, the transaction model to which the call relationship information shown in the example corresponds is found to be {H1,I1,R1R2R3}. Then, a message in the HTTP for which two candidates (H1,H2) have existed is simultaneously found to be H1.

Moreover, for processes regarding the message group represented as the list, due to characteristics of the processes such as DB search, although an order of the processes is the same, the same process may be repeated arbitrary times, such as "AbbbbbC" and "AbC". In an example of a system regarding banking business, if one customer simultaneously makes a request for an inquiry process for a plurality of accounts, or the like, since the number of accounts owned by each customer is different, the message group has a different number of times of repetition of a part corresponding to referring to the accounts.

In such a case, even if a part of "b" in "AbbbbbC" and "AbC" appears any number of times, "AbbbbbC" and "AbC" are handled as the same message group. In the transaction models 460, the message group is represented by a notation of "Ab*C". The message matching module 150 judges that the message groups such as "AbbbbbC" and "AbC" is identical to "Ab*C", while performing the matching process.

In this way, in the matching between the call relationship information stored in the call relationship information 450 and the transaction models defined in the transaction models 460, the following processes are performed to specify the transaction model to which the call relationship information stored in the call relationship information 450 corresponds. (1) A comparison process for a part of the message group represented as the list. (2) An extraction of transaction models to which the call relationship information can correspond. (3) A comparison process between the extracted transaction models and a part other than the message group in the call relationship information.

Figure 16:
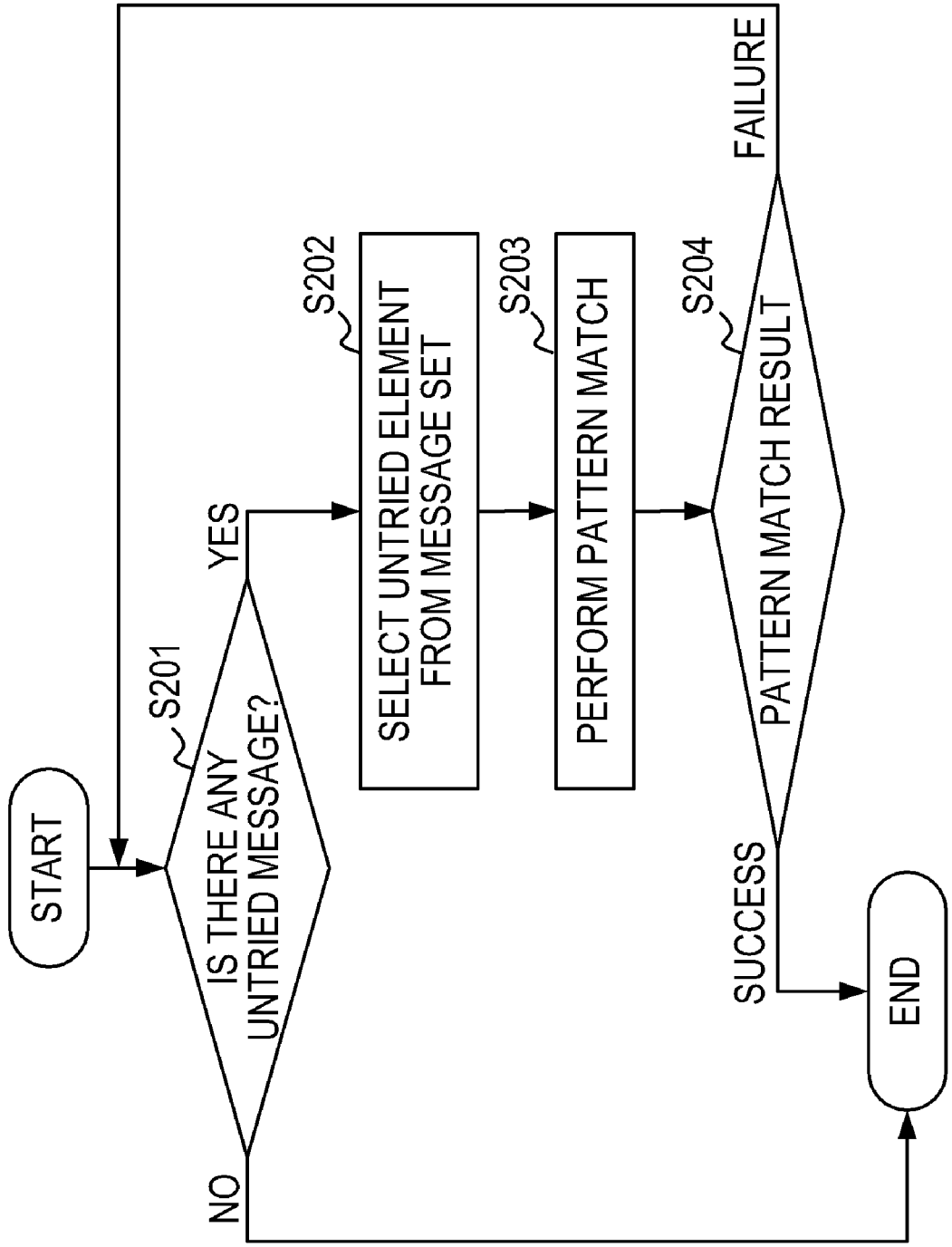
FIG. 16 illustrates a flowchart showing an example of a process in the message matching module for messages represented as a list according to the embodiment.

An example of a process in the message matching module 150, regarding the comparison process between the part of the message group represented as the list in the call relationship information 450 and the transaction models in the transaction models 460 is shown in a flowchart of FIG. 16.

A comparison process between a list representation part in the call relationship information 450 and list representation parts in the transaction models 460 is performed. The process is started by using a message group of one piece of information desired to be compared, from the call relationship information 450, as input information.

It is judged whether or not there is an element for which this process has not been tried, in a part represented as a set in the input information (S201). If there is no untried element (S201, NO), this flow is completed.

If there is the untried element in the part represented as the set in the input information (S201, YES), the untried element is selected and set as a message group displayed as the list (S202), and compared with all information displayed as the list in the transaction models 460 (S203, a matching procedure).

It is judged whether or not there has been the transaction model 460 identical to the message group displayed as the list (S204, the matching procedure). If there has been identical information (S204, SUCCESS, the matching procedure), this flow is completed. If there has not been matching information (S204, FAILURE, the matching procedure), the process returns to a procedure of S201.

Next, the case where the part other than the message group represented as the list in the call relationship information 450 exists as a set will be described.

For the matching process of the transaction models 460, basically, a process similar to that for the part of the message group represented as the list is performed. However, there may not be a transaction model which is completely identical. Thus, in the matching process, a transaction model which is the most corresponding to the part other than the message group represented as the list in the call relationship information 450 can be selected.

The most corresponding transaction model is a transaction model with a largest evaluation value represented by m/n, if the number of nodes, which is the number of the call relationships in the transaction model, is "n", and the number of nodes which have been used in the matching and have been identical is "m", in the matching process.

Figure 17:
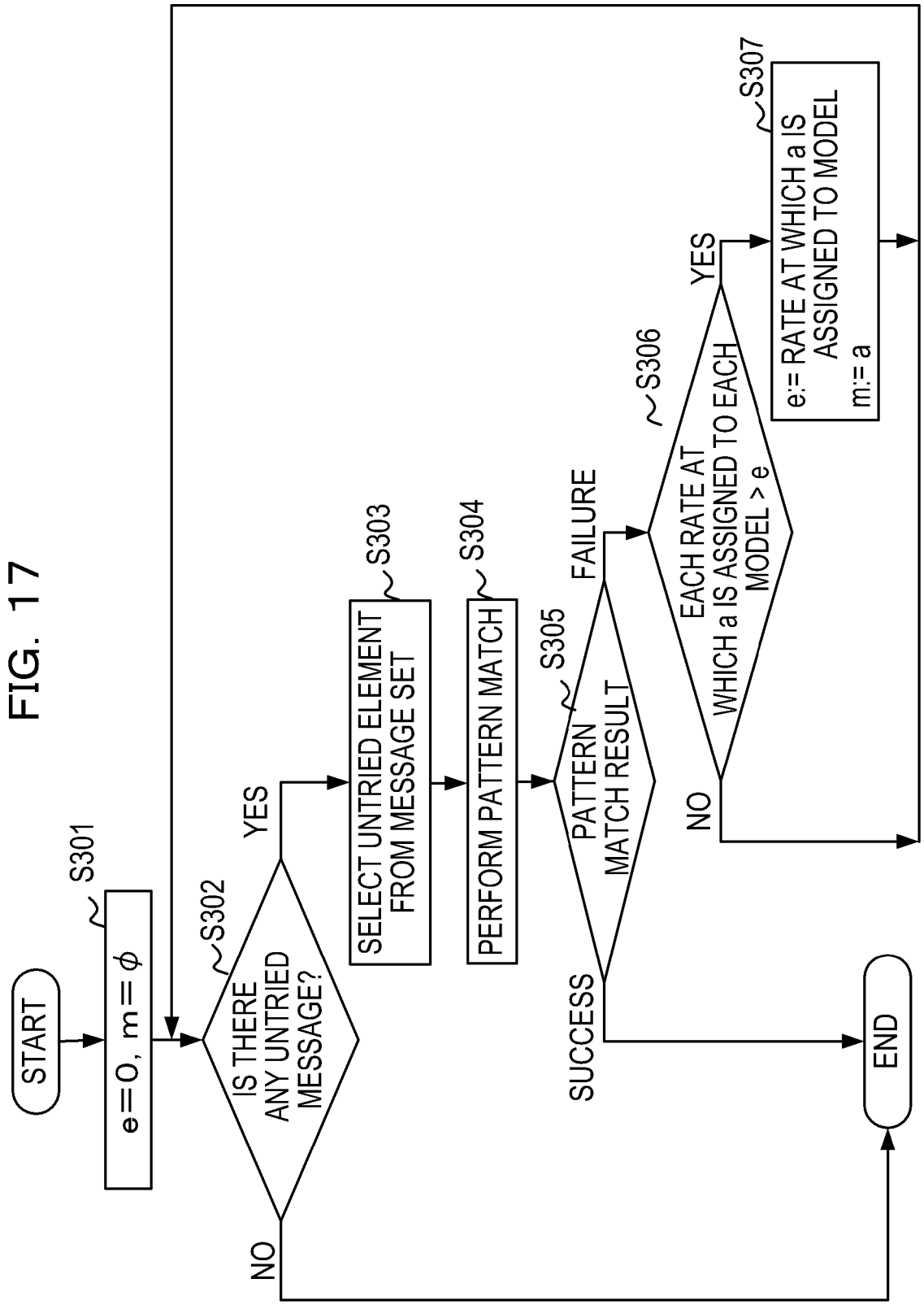
FIG. 17 illustrates a flowchart showing an example of a process in the message matching module for messages other than the list representation according to the embodiment.

An example of a process in the message matching module 150, regarding the comparison process between the part other than the message group represented as the list in the call relationship information 450 and the transaction models in the transaction models 460 is shown in a flowchart of FIG. 17.

This flow starts the process by using one call relationship stored in the call relationship information 450, as input information.

First, the message matching module 150 initializes a variable "e" to "0", and initializes a set "m" to "φ (null set)" (S301). Next, the message matching module 150 judges whether or not there is an element for which this comparison process has not been tried (S302). If there is no untried element (S302, NO), this flow is completed. If there is the untried element (S302, YES), the message matching module 150 selects the untried element, sets the untried element as "a", and compares "a" with the transaction models 460 (S304, the matching procedure), and judges whether or not a result of the comparison has been identical (S305, the matching procedure).

If the result of the comparison has been identical (S305, SUCCESS, the matching procedure), the message matching module 150 completes this flow. If the result of the comparison has not been identical (S305, FAILURE, the matching procedure), the message matching module 150 judges whether or not each rate at which "a" is assigned to each model is larger than "e" (S306, the matching procedure).

If the rate at which "a" is assigned to the model is less than or equal to "e" (S306, NO, the matching procedure), the message matching module 150 returns to a procedure of S302. If the rate at which "a" is assigned to the model is larger than "e" (S306, YES, the matching procedure), the message matching module 150 replaces "e" with the rate at which "a" is assigned to the model, and replaces "m" with "a" (S307, the matching procedure), and returns to the procedure of S302.

As a result of the above described process, if there has been an identical model, the message matching module 150 selects the identical model. If there has not been the identical model, the message matching module 150 selects the transaction model with a largest value of "e" (m/n).

If the comparison process has failed for all elements, the message matching module 150 selects any transaction model from the transaction models 460. Selection methods thereof include a random selection method and the like.

According to the present embodiment, the transaction which has not been able to be estimated before can be estimated, and furthermore, in comparison with the case where packet loss data is directly estimated, a success rate of the matching process to the transaction models can be improved.

Moreover, there is an advantage that the transaction which has not been able to be estimated before can be estimated, and furthermore, in comparison with the case where the packet loss data is directly estimated, the success rate of the matching process to the transaction models is improved.

The present embodiment can be practiced in various other forms without deviating from the gist or the main characteristics thereof. Thus, the above described embodiment is merely an exemplification in all respects, and should not be restrictively construed. The scope of the present invention is indicated by the claims, and is not bounded by the text of the specification in any way. Furthermore, all variations, various improvements, alternatives and alterations belonging to the equivalent scope of the claims are all within the scope of the present invention.

Figure 18:
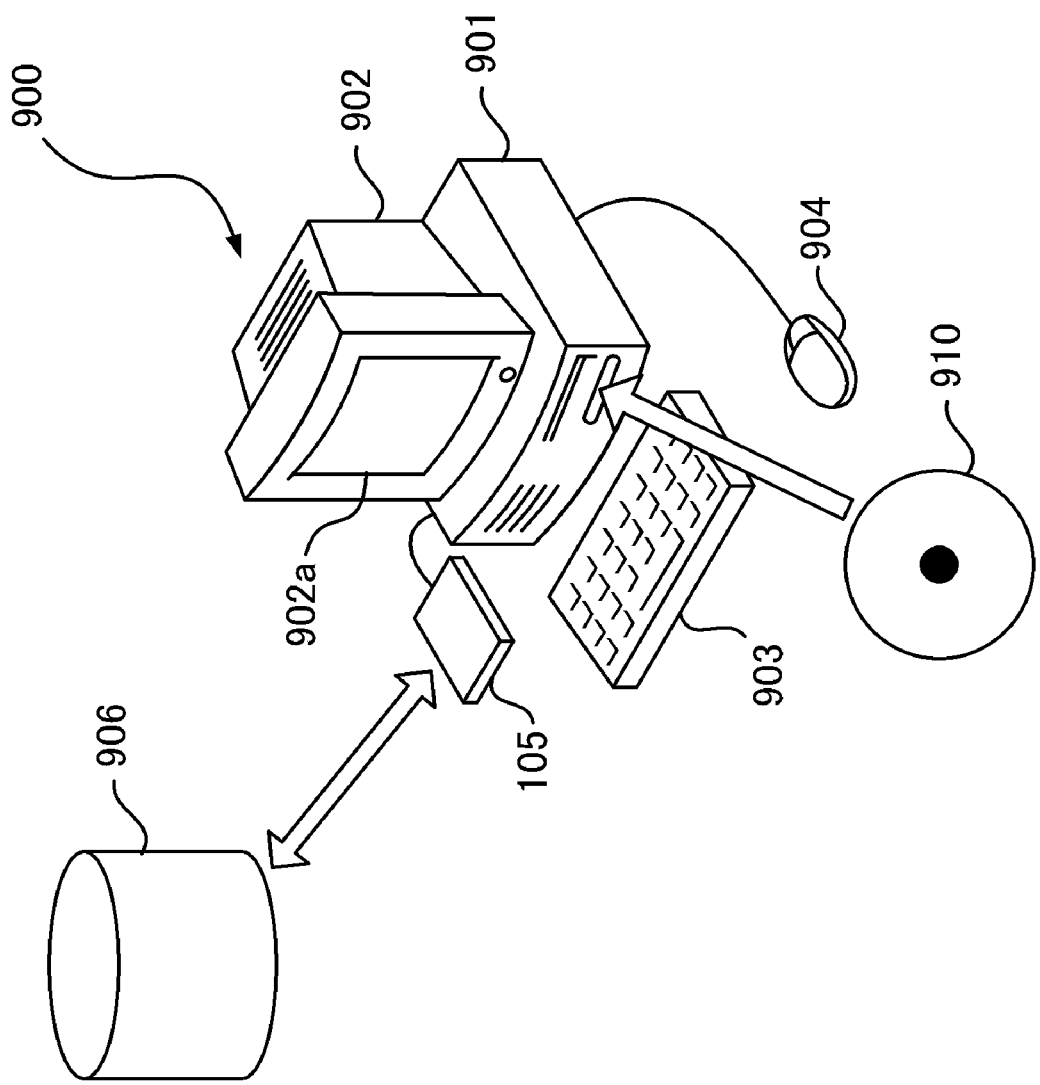
FIG. 18 illustrates a diagram showing an example of a computer system to which the present embodiment is applied.
Figure 19:
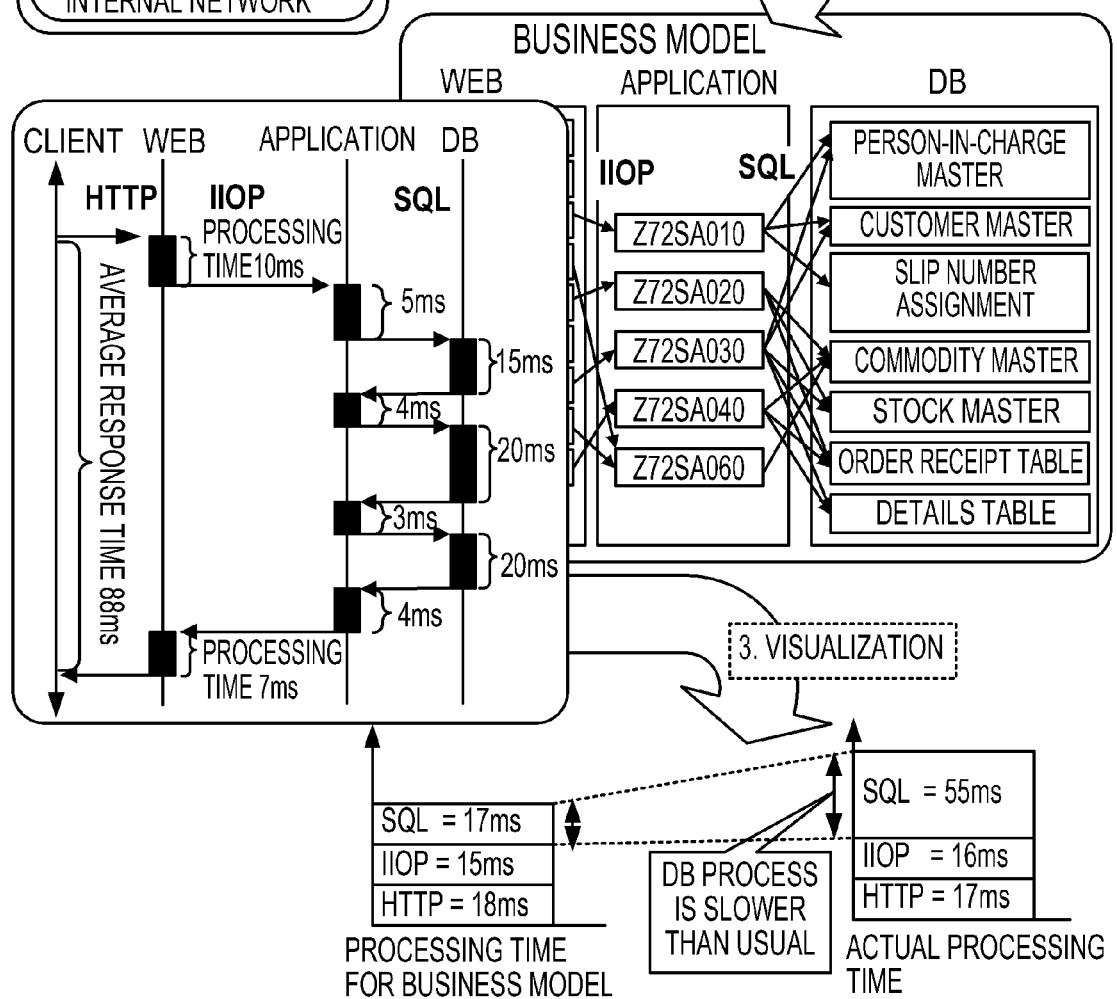
FIG. 19 illustrates a diagram explaining a process outline according to the system visualization apparatus.

The present embodiment is applicable to a computer system as shown below. FIG. 18 illustrates a diagram showing an example of the computer system to which the present embodiment is applied. A computer system 900 shown in FIG. 18 has a main body module 901 including a CPU, a disk drive and the like, a display 902 which displays an image according to an instruction from the main body module 901, a keyboard 903 with which various information is inputted to the computer system 900, a mouse 904 which designates an arbitrary position on a display screen 902a of the display 902, and a communication apparatus 905 which accesses an external database and the like to download a program and the like stored in another computer system. As the communication apparatus 905, a network communication card, a modem and the like are conceivable.

A program which causes the computer system as described above which constitutes the system analysis apparatus to execute the above described respective procedures can be provided as a system analysis program. The computer system which constitutes the system analysis apparatus can be caused to execute this program by storing this program in a recording medium readable by the computer system. The program which executes the above described respective procedures is stored in a portable recording medium such as a disk 910, or downloaded from a recording medium 906 in another computer system by the communication apparatus 905. Moreover, the system analysis program (system analysis software) which provides the computer system 900 with at least an analysis function is inputted to the computer system 900 and compiled. This program causes the computer system 900 to operate as a system analysis system including the analysis function. Moreover, this program may be stored, for example, in a computer-readable recording medium such as the disk 910. Here, recording media readable by the computer system 900 include an internal storage device such as a ROM or a RAM, which is internally mounted in the computer, a portable storage medium such as the disk 910, a flexible disk, a DVD disk, a magneto optical disk or an IC card, a database which retains a computer program, or another computer system as well as its database, or various recording media which can be accessed by the computer system connected via communication means such as the communication apparatus 905.

What is claimed:

1. A non-transitory computer-readable recording medium storing a system analysis program containing instructions executable on a computer, the program causing the computer to execute:
   a data observation procedure for observing data which has elements constituting messages communicated on an analysis target system;
   a message reconstruction procedure for, if the observation of said data has partially failed, reconstructing the observed data and the data of which the observation has failed, into rules containing a request and a response which are communicated on the system;
   a message candidate extraction procedure for comparing said message rules in which contents of said messages have been defined, with the reconstructed messages, and extracting messages from said message rules which are identical to said reconstructed messages, from the messages defined in said message rules, as message candidates;
   a call relationship extraction procedure for extracting a call relationship between said message candidates; and
   a matching procedure for comparing transaction models in which processes in units of transactions on said system have been modeled based on call relationships among the processes on said system, with said extracted call relationship, and selecting and determining a transaction model identical to said call relationship.

2. The non-transitory computer-readable recording medium according to claim 1, wherein said message candidate extraction procedure includes extracting said message rules which can be identical to the reconstructed messages.

3. The non-transitory computer-readable recording medium according to claim 1, wherein said call relationship is a parent-child relationship between said messages, which is calculated from types of said messages regarding a request and a response in processes among computers, and reception times of said messages regarding the request and the response.

4. The non-transitory computer-readable recording medium according to claim 1, wherein said transaction model is generated by data mining based on logs of messages flowing on said analysis target system and types of said messages.

5. The non-transitory computer-readable recording medium according to claim 1, wherein if there has not been said transaction model which is completely identical to said call relationship, said matching procedure includes calculating predetermined evaluation values, on the basis of a start time instant and a response time instant of each requested process, for all said transaction models, and selecting said transaction model with a largest evaluation value.

6. The non-transitory computer-readable recording medium according to claim 5, wherein said matching procedure includes calculating the predetermined evaluation value from the number of all call relationships in said transaction model, and the number of nodes which have been identical in the comparison with said call relationship.

7. A system analysis apparatus having a processor, the apparatus comprising:
   a data observation module which causes the processor to observes data which has elements constituting messages communicated on an analysis target system;
   a message reconstruction module which, if the observation of said data has partially failed, causes the processor to reconstruct the observed data and the data of which the observation has failed, into messages regarding a request and a response which are communicated on the system;
   a message candidate extraction module which causes the processor to compares message rules in which contents of said messages have been defined, with the reconstructed messages, and extracts messages in said message rules which are identical to said reconstructed messages, from the messages defined in said message rules, as message candidates;
   a call relationship extraction module which causes the processor to extracts a call relationship between said message candidates; and
   a matching module which causes the processor to compares transaction models in which processes in units of transactions on said system have been modeled based on call relationships among the processes on said system, with said extracted call relationship, and selects and determines a transaction model identical to said call relationship.

8. The system analysis apparatus according to claim 7, wherein said message candidate extraction module causes the processor to extract said message rules which can be identical to the reconstructed messages.

9. The system analysis apparatus according to claim 7, wherein said call relationship is a parent-child relationship between said messages, which the processor calculates from types of said messages regarding a request and a response in processes among a plurality of computers, and reception times of said messages regarding the request and the response.

10. The system analysis apparatus according to claim 7, wherein the processor generates said transaction model by data mining based on logs of messages flowing on said analysis target system and types of said messages.

11. The system analysis apparatus according to claim 7, wherein if there has not been said transaction model which is completely identical to said call relationship, said matching module causes the processor to calculate predetermined evaluation values for all said transaction models, and selects said transaction model with a largest evaluation value.

12. The system analysis apparatus according to claim 11, wherein said matching module causes the processor to calculate the predetermined evaluation value from the number of all call relationships in said transaction model, and the number of nodes which have been identical in the comparison with said call relationship.

13. A system analysis method executed by a computer having a processor, the method comprising:
    a data observation procedure causes the processor to observe data which has elements constituting messages communicated on an analysis target system;
    a message reconstruction procedure for, if said data observation procedure has partially failed to observe said data, causes the processor to reconstruct the observed data and the data of which the observation has failed, into messages regarding a request and a response which are communicated on the system;
    a message candidate extraction procedure which causes the processor to compare message rules in which contents of said messages have been defined, with the reconstructed messages, and extracting messages in said message rules which are identical to said reconstructed messages, from the messages defined in said message rules, as message candidates;
    a call relationship extraction procedure which causes the processor to extract a call relationship between said message candidates; and
    a matching procedure which causes the processor to compare transaction models in which processes in units of transactions on said system have been modeled based on call relationships among the processes on said system, with said extracted call relationship, and selecting and determining a transaction model identical to said call relationship.

14. The system analysis method according to claim 13, wherein said message candidate extraction procedure includes causing the processor to extract said message rules which can be identical to the reconstructed messages.

15. The system analysis method according to claim 13, wherein said call relationship is a parent-child relationship between said messages, which causes the processor to calculate from types of said messages regarding a request and a response in processes among a plurality of computers, and reception times of said messages regarding the request and the response.

16. The system analysis method according to claim 13, wherein the processor generates said transaction model by data mining based on logs of messages flowing on said analysis target system and types of said messages.

17. The system analysis method according to claim 13, wherein if there has not been said transaction model which is completely identical to said call relationship, said matching procedure includes causing the processor to calculate predetermined evaluation values for all said transaction models, and selecting said transaction model with a largest evaluation value.

* * * * *

UNITED STATES PATENT AND TRADEMARK OFFICE
CERTIFICATE OF CORRECTION

PATENT NO.      : 8,156,087 B2
APPLICATION NO. : 12/431637
DATED           : April 10, 2012
INVENTOR(S)     : Shimizu et al.

Page 1 of 1

It is certified that error appears in the above-identified patent and that said Letters Patent is hereby corrected as shown below:

In the Claims

Col. 14, 53-54      Delete "compares" and insert --compare-- in its place.

Signed and Sealed this
Tenth Day of July, 2012

David J. Kappos
*Director of the United States Patent and Trademark Office*